(12) United States Patent
Lambert et al.

(10) Patent No.: US 10,732,420 B2
(45) Date of Patent: Aug. 4, 2020

(54) HEAD UP DISPLAY WITH SYMBOLS POSITIONED TO AUGMENT REALITY

(71) Applicant: Panasonic Automotive Systems Company of America, Division of Panasonic Corporation of North America, Peachtree City, GA (US)

(72) Inventors: David Kay Lambert, Sterlling Heights, MI (US); Walter Joseph Nill, Davison, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 15/707,915

(22) Filed: Sep. 18, 2017

(65) Prior Publication Data

US 2018/0081181 A1 Mar. 22, 2018

Related U.S. Application Data

(60) Provisional application No. 62/397,170, filed on Sep. 20, 2016.

(51) Int. Cl.
*G02B 27/01* (2006.01)
*G02B 27/00* (2006.01)

(52) U.S. Cl.
CPC ......... *G02B 27/0189* (2013.01); *G02B 27/01* (2013.01); *G02B 27/0103* (2013.01); *G02B 27/0093* (2013.01); *G02B 2027/0138* (2013.01); *G02B 2027/0141* (2013.01); *G02B 2027/0187* (2013.01); *G02B 2027/0196* (2013.01)

(58) Field of Classification Search
CPC ............ G02B 27/0189; G02B 27/0103; G02B 27/0093; G02B 2027/0196; G02B 2027/0141; G02B 2027/0138
See application file for complete search history.

(56) References Cited

U.S. PATENT DOCUMENTS 7,675,296 B2 3/2010 Lambert et al.
8,553,334 B2 10/2013 Lambert et al.

OTHER PUBLICATIONS

Prinzel, Lawrence, III., Head-Up Displays and Attention Capture, NASA, STI Feb. 2004, NASA/TM-2004-213000, Hampton, VA.

*Primary Examiner* — Jack Dinh
(74) *Attorney, Agent, or Firm* — Laurence S Roach, Esq.

(57) ABSTRACT

A motor vehicle includes a head up display projector producing a light field based upon image data such that the light field is reflected off of a windshield of the motor vehicle and is then visible to a driver of the motor vehicle as a virtual image. First means determines locations of physical objects visible to the driver through the windshield. Second means determines locations of eyes of the driver. An electronic processor receives first data indicative of the determined locations of the physical objects, and receives second data indicative of the determined locations of the eyes of the driver. The electronic processor produces the image data dependent upon the first data and the second data such that a symbol in the virtual image appears to be in a predetermined position relative to a selected one of the physical objects.

15 Claims, 3 Drawing Sheets

HEAD UP DISPLAY WITH SYMBOLS POSITIONED TO AUGMENT REALITY

CROSS-REFERENCE TO RELATED APPLICATION

This application claims benefit of U.S. Provisional Application No. 62/397,170 filed on Sep. 20, 2016, which the disclosure of which is hereby incorporated by reference in its entirety for all purposes.

FIELD OF THE INVENTION

The disclosure relates to a head up display (HUD) in a motor vehicle.

BACKGROUND OF THE INVENTION

A head up display emits light that reflects from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

Current practice for automotive head up displays is to display symbols that are not positioned relative to objects seen by the driver. Examples include: vehicle speed, the speed limit, a warning that the vehicle is crossing a lane marker, and a warning that another vehicle is in the vehicle's blind spot.

FIG. 1 illustrates one embodiment of a head up display of the prior art, including a picture generation unit 28 and projection optics in the form of a mirror 30 that tilts. Mirror 30 reflects a light field from picture generation unit 28 onto a windshield 14, which further reflects the light field toward the eyes of a driver 24, who sees the light field as a virtual image disposed outside of windshield 14. In order to accommodate a range of driver heights, mirror 30 inside the head up display is tilted to adjust the apparent height of the virtual image seen by driver 24.

Typically, the tilt adjustment is manually set by the driver to enable the driver to see the virtual image. However, the mirror tilt adjustment changes the vertical position of the virtual image, as seen by the driver. This makes it difficult to accurately position symbols on the virtual image as seen by the driver.

Some aircraft use a head up display to display to the pilot symbols at an intended position relative to real world objects. Aircraft use a separate combiner from the windscreen of the aircraft. Consequently, they use a different optical projection method to create a virtual image.

SUMMARY

The present invention may provide a means to overlay symbols on a virtual image a driver views through the front windshield of a vehicle such that the driver sees the symbols positioned as intended near specific real-world objects. The virtual image may be produced by a head up display. The inventive system may sense the driver's eye position, determine the position of real-world object(s), classify the objects, and use an algorithm to position symbols on a display used to create the image shown by the head up display so the driver sees the symbols in the virtual image created by the head up display, positioned as intended, near specific real-world object(s).

In one embodiment, the invention comprises a motor vehicle including a head up display projector producing a light field based upon image data such that the light field is reflected off of a windshield of the motor vehicle and is then visible to a driver of the motor vehicle as a virtual image. First means determines locations of physical objects visible to the driver through the windshield. Second means determines locations of eyes of the driver. An electronic processor is communicatively coupled to each of the head up display projector, the first means and the second means. The electronic processor receives first data indicative of the determined locations of the physical objects, and receives second data indicative of the determined locations of the eyes of the driver. The electronic processor produces the image data dependent upon the first data and the second data such that a symbol in the virtual image appears to be in a predetermined position relative to a selected one of the physical objects that is visible to the driver through the windshield.

In another embodiment, the invention comprises a display method for a motor vehicle, including producing a light field based upon image data such that the light field is reflected off of a windshield of the motor vehicle and is then visible to a driver of the motor vehicle as a virtual image. Locations of physical objects visible to the driver through the windshield are determined. Locations of the eyes of the driver are determined. The image data is produced dependent upon the determined locations of the physical objects, and upon the determined locations of the eyes of the driver such that a symbol in the virtual image appears to be in a predetermined position relative to a selected one of the physical objects visible to the driver through the windshield.

In yet another embodiment, the invention comprises a motor vehicle including a head up display projector producing a light field based upon image data such that the light field is reflected off of a windshield of the motor vehicle and is then visible to a driver of the motor vehicle as a virtual image. First means determines locations and classifications of physical objects visible to the driver through the windshield. Second means determines a location of at least a portion of a head of the driver. An electronic processor is communicatively coupled to each of the head up display projector, the first means and the second means. The electronic processor receives first data indicative of the determined locations and classifications of the physical objects, and receives second data indicative of the determined location of the portion of the head of the driver. The image data is produced dependent upon the first data and the second data such that a symbol in the virtual image appears to be in a predetermined position relative to a selected one of the physical objects visible to the driver through the windshield. The symbol is dependent upon the determined classification of the selected one of the physical objects visible to the driver through the windshield.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
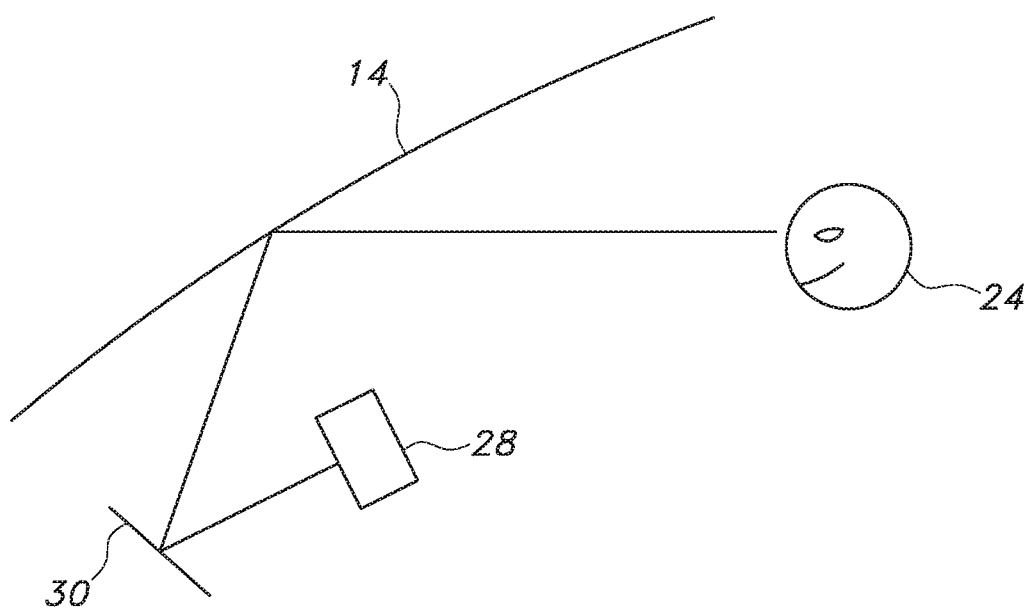
FIG. 1 is a schematic diagram of one embodiment of a head up display of the prior art.
Figure 2:
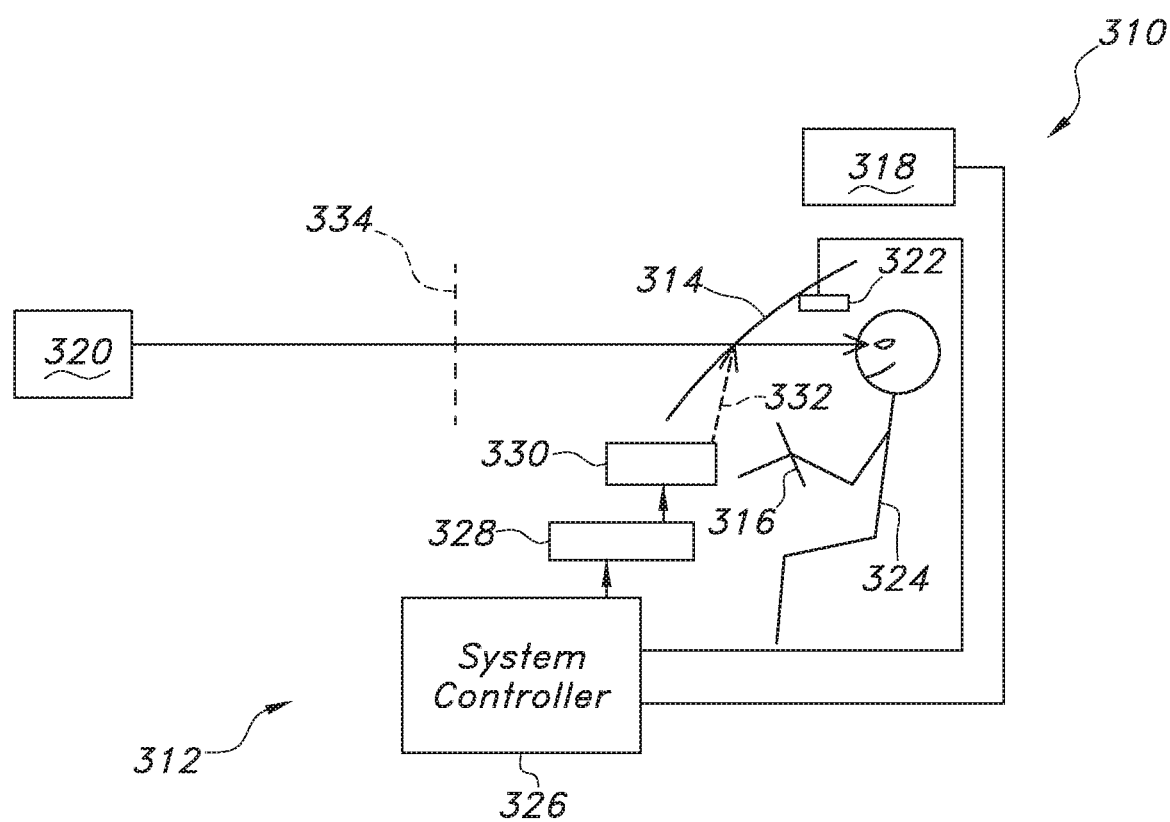
FIG. 2 is a schematic side view of one embodiment of a motor vehicle including a head up display arrangement of the present invention.

FIG. 2 illustrates one embodiment of a motor vehicle 310 of the present invention, including a head up display arrangement 312, a windshield 314, and a steering wheel 316. Head up display arrangement 312 includes a means 318 to determine the location of a real-world (e.g., physical) object 320 relative to vehicle 310; means 322 to determine the eye position of a driver 324; a system controller 326; a display and picture generation unit 328; and projection optics 330.

Projection optics 330 may project a light field 332 onto windshield 314 such that light field 332 is reflected off of windshield 314 and is visible to driver 324 as a virtual image 334. System controller 326 may be capable of classifying the objects, and may include a means to identify real-world objects 320 to the extent needed to classify objects 320.

System controller 326 may be capable of positioning symbols on display 328 such that the symbols are positioned within virtual image 334 as intended relative to an appropriate subset of the object(s) 320 that can be viewed by driver 324. System controller 326 may include a means to identify the real-world objects to the extent needed to classify objects 320. System controller 326 may determine where to position the symbols on projection optics 330 so the symbols are seen by driver 324 in the intended position within virtual image 334 relative to one or more real-world object(s) 320 if needed to provide the intended functionality of the system.

Means 318 to determine the location of; and classify, a real-world object 320 that the driver can see, may include the following:
1. A camera in the vehicle, positioned, for example, near the rear view mirror, may capture images of the scene ahead of (e.g., in front of) the driver. The current image, together with recent images obtained by the same camera, may be used as inputs to a model within a computational system that interprets the image elements as, for example, other vehicles, pedestrians, traffic signs, fixed objects such as construction barrels, the edge of the roadway, buildings, and so on. The image elements are also assigned an approximate position within the model. The model also enables the classification of the objects as, for example, pedestrians that need to be protected, small animals, fixed road hazards, motorcycles, small cars, large trucks, and so on.
2. Images are obtained from a pair of cameras, displaced or offset from one another, both capturing images of the scene viewed by the driver. Corresponding elements in the pair of images are identified. The displacement of the corresponding elements in one image relative to the other is used to determine a distance from the cameras to the object. The image position and the distance are used to estimate the position of the object. The object images are also used to classify the objects as, for example, pedestrians that need to be protected, small animals, fixed road hazards, motorcycles, small cars, large trucks, and so on.
3. A radar system determines the position(s) of nearby object(s) based on the direction to the object and the time-of-flight for a signal to travel to the object and be detected upon its return. Additional information, such as a camera image, is used also used to classify the objects as, for example, pedestrians that need to be protected, small animals, fixed road hazards, motorcycles, small cars, large trucks, and so on.
4. A camera system determines the position(s) of nearby object(s) based on a camera image and the time-of-flight for a signal to travel to the object and be detected upon its return. The camera image together with image processing is used to classify the objects as, for example, pedestrians that need to be protected, small animals, fixed road hazards, motorcycles, small cars, large trucks, and so on.
5. An ultrasonic system determines the position(s) of nearby object(s) based on the locations of ultrasonic transducers that emit ultrasonic signals and the time-of-flight for the return signal(s) to be detected. Additional means, such as a camera image and an image processing system, is used also used to classify the objects as, for example, pedestrians that need to be protected, small animals, fixed road hazards, motorcycles, small cars, large trucks, and so on.
6. The position of the vehicle, obtained for example from a global positioning receiver, together with the stored positions of fixed objects, obtained for example, from an on-board database in the vehicle, are used to determine the positions and classification of fixed objects near the vehicle.
7. An off-board system, such as a camera system or radar system located at an intersection, determines safety-relevant information, such as a warning that another vehicle is illegally running a red light together with the current location of the vehicle running the red light. The information is communicated by wireless means to a system in the vehicle of interest, to position symbols to be displayed at the appropriate position in the HUD image to warn the driver. The communicated information also provides and/or enables the classification of the object(s).
8. The vehicle communicates wirelessly with other vehicles to determine their relative positions and classification. One means is to obtain absolute position information, as from a global positioning receiver, and determine the relative distance using a mathematical operation, such as vector subtraction. Another means is to use dead reckoning from known way points, such as roadside markers. Another means is to query the on-board estimate maintained within a model in a computational means in the other vehicle. Another means is to use the time-of-response for a wireless transducer in the other vehicle.
9. The vehicle communicates with a transponder associated with a roadside object, such as a road-side construction barrel, a worker, or road-construction equipment, to determine what the object is and its relative location.

Means 322 to determine the location of the driver's eyes within the vehicle may include:
1. Camera means within the vehicle are used to locate the position of the driver's eyes.

2. The sensed position or orientation of objects such as the rear-view mirror, the side view mirrors, the position of the driver's seat, the position of an adjustable mirror in the HUD, the position of the head rest behind the driver's head, and so on, are used to infer the position of the driver's eyes.
3. Multiple measures to determine driver eye position are combined to obtain a more accurate estimate than provided by any of the individual estimates. One way to do this is to assign a weight to individual estimates and use the algorithm <x>, the final estimate is <x>=square root ((sum of ((individual weight)×(measured value))^2 for all the measurements)/(sum of (individual weight)^2 for all the measurements)).

The algorithm used to determine the object(s) to be annotated, and where to position symbols to be seen by the driver, makes use of one or more of the following:

1. The position of the object is determined in 3D space, the position of the driver's eyes is determined in 3D space, a line between these two points is created, and the position of the virtual image plane of the HUD is determined in 3D space. The position of the intersection of the line with the virtual image plane is determined. The location of the intersection relative to the boundary of the virtual image is used to determine where to position one or more symbols on the virtual image.
2. The windshield is an optical element that affects the direction in which an object is seen, relative to the actual direction of the object. To compensate for this effect, the displacement of the actual direction of an object relative to the perceived direction of an object is mapped for the windshield, for one or more locations for the driver's eyes. This displacement is used in the algorithm used to determine where to position objects on the virtual image to be seen by the driver. The algorithm used to determine the mapping may take into account the position of the driver's eyes and/or the position of the object outside of the vehicle.
3. The classification of nearby object(s), their distance, speed, direction, and other relevant information such as a measure of the hazard level of the situation, the driver's input as to the maximum amount of visual clutter to be shown, and other design considerations, are used to determine the object(s) the system should annotate, and possibly a measure of the prominence of the desired annotation. Variables that may be considered to quantify the hazard level of the situation include (A) the identity of the driver and a measure of their driving safety based on past performance using one or more of traffic accident insurance claims, a record of their past traffic citations, and information about their driving style obtained by monitoring their driving as with an insurance dongle plugged into the OBD connector in the passenger compartment; (B) whether the driver is a new driver with a learner's permit or recently licensed; (C) driver age; (D) the time of day; (E) whether it is dark outside; (F) the date (weekends and certain holidays are correlated with higher danger from drunk driving); (G) the outside temperature (an indication of possible icy roads), (H) whether a travel advisory has been issued, (I) the length of time the driver has been driving in the current trip, (J) the number of vehicle occupants as determined for example by sensors in one or more seats in the vehicle and/or from a camera; (K) the noise level in the vehicle as determined for example by the volume of the sound from the entertainment system or from one or more microphones in the vehicle; (L) whether a cell phone is in use in the vehicle as determined for example by a sensor of electromagnetic radiation or by means of a wireless connection from the cell phone to the vehicle; (M) whether the vehicle entertainment system is currently being adjusted; (N) vehicle speed; (O) the outputs of sensors that monitor the driver such as for drowsiness, posture change, grip strength on the steering wheel; and (P) the presence of a nearby vehicle running a red light or a stop sign, as communicated wirelessly to the vehicle. Another possible input to the system is how many times the vehicle has been at the current location. If this is a new situation for the driver, they may need different information than they need if they routinely drive the same route. Variables that affect the visual impact of the symbols displayed to the driver include: brightness, font, width of displayed lines, color, and image size. To attract attention, the image brightness and/or color can be time dependent. An audio signal can also be used to indicate that a message of high importance has been displayed.

For effective human-machine interaction between the driver of a motor vehicle and the vehicle's systems, the driver needs to quickly and accurately perceive information communicated by the vehicle concerning objects the driver can see through the windshield. Examples include a warning that a pedestrian is in the path of the vehicle, the path the vehicle should take to arrive at a destination, and a warning that the vehicle in front is braking. One method to communicate such information to the driver is to place visual symbols in a virtual image, in the appropriate position, as seen by the driver, relative to objects the driver can directly see through the windshield outside of their vehicle.

Figure 3:
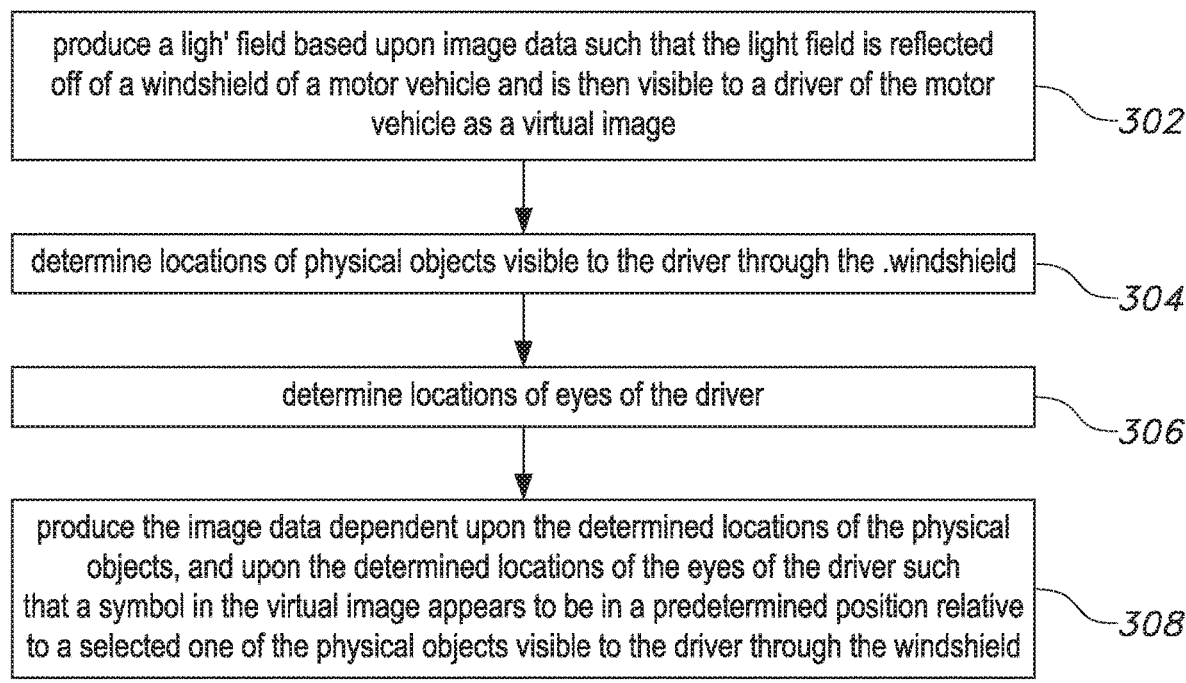
FIG. 3 is a flow chart of one embodiment of a display method of the present invention for a motor vehicle.

FIG. 3 illustrates one embodiment of a display method 300 of the present invention for a motor vehicle. In a first step 302, a light field is produced based upon image data such that the light field is reflected off of a windshield of a motor vehicle and is then visible to a driver of the motor vehicle as a virtual image. For example, projection optics 330 may project a light field 332 based on image data from controller 326 onto windshield 314 such that light field 332 is reflected off of windshield 314 of motor vehicle 310 and is visible to driver 324 as a virtual image 334.

Next, in step 304, locations of physical objects visible to the driver through the windshield are determined. For example, means 318 to determine the location of a real-world object 320 that the driver can see may include a camera in the vehicle capturing images of the scene in front of the vehicle. The image elements are assigned an approximate position based on the captured images.

In a next step 306, locations of eyes of the driver are determined. For example, means 322 to determine the location of the driver's eyes within the vehicle may include a camera within the vehicle that captures images of the driver's face. The images may be used by controller 326 to locate the position of the driver's eyes.

In a final step 308, the image data is produced dependent upon the determined locations of the physical objects, and upon the determined locations of the eyes of the driver such that a symbol in the virtual image appears to be in a predetermined position relative to a selected one of the physical objects visible to the driver through the windshield. For example, after the position of the object is determined in 3D space, and the position of the driver's eyes is determined in 3D space, a line between these two points is created, and the position of the virtual image plane of the HUD is determined in 3D space. The position of the intersection of the line with the virtual image plane is determined. The location of the intersection relative to the boundary of the virtual image is used to determine where to position one or more symbols on the virtual image.

The invention has been described herein as electronically determining the location of the driver's eyes and positioning symbols within the HUD virtual image based on the determined position. However, the scope of the invention may also include using a mirror that tilts, as in a conventional automotive head up display, measuring the tilt angle of the mirror, and including the tilt angle in the algorithm that determines where symbols are to be displayed within the display of the HUD.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A motor vehicle, comprising:
   a head up display projector configured to produce a light field based upon image data such that the light field is reflected off of a windshield of the motor vehicle and is then visible to a driver of the motor vehicle as a virtual image;
   first means to determine locations and classifications of physical objects visible to the driver through the windshield, wherein the first means comprises a global positioning receiver configured to provide geographical coordinates for the motor vehicle;
   second means to determine a location of at least a portion of a head of the driver; and
   an electronic processor communicatively coupled to each of the head up display projector, the first means and the second means, the electronic processor being configured to:
      receive first data indicative of the determined locations and classifications of the physical objects;
      use the geographical coordinates and stored geographical coordinates of the physical objects to determine the positions of the physical objects and to classify the physical objects;
      receive second data indicative of the determined location of the portion of the head of the driver; and
      produce the image data based upon the first data and the second data such that a symbol in the virtual image appears to be in a predetermined position relative to one of the physical objects visible to the driver through the windshield, the symbol being dependent upon the determined classification of the one of the physical objects visible to the driver through the windshield.

2. The motor vehicle of claim 1 wherein the first means comprises a camera configured to capture images of a scene in front of the motor vehicle in front of the motor vehicle.

3. The motor vehicle of claim 1 wherein the first means comprises a pair of cameras offset from one another, each camera being configured to capture images of a scene in front of the motor vehicle, wherein the electronic processor is configured to use a displacement between positions of a physical object in the captured images to determine a distance from at least one of the cameras to the object.

4. The motor vehicle of claim 3 wherein the electronic processor is configured to use the captured images to classify the physical object.

5. The motor vehicle of claim 1 wherein the first means comprises a radar system configured to determine a position of the physical objects based on a direction to the object and a time-of-flight for a signal to travel to the object and be detected upon its return.

6. The motor vehicle of claim 1 wherein the first means comprises a camera system configured to determine a position of the physical objects based on at least one captured camera image and a time-of-flight for a signal to travel to the object and be detected upon its return.

7. The motor vehicle of claim 1 wherein the first means comprises an ultrasonic system configured to determine a position of the physical objects based on locations of ultrasonic transducers that emit ultrasonic signals and based on a time-of-flight for return signals to be detected.

8. The motor vehicle of claim 1 wherein the first means is wirelessly communicatively coupled to an off-board system, including a camera system or radar system located at a road intersection, the off-board system providing safety-relevant information, the electronic processor being configured to position symbols in the virtual image dependent upon the safety-relevant information.

9. The motor vehicle of claim 1 wherein the first means is configured to communicate wirelessly with other vehicles to determine their relative positions and classifications.

10. The motor vehicle of claim 9 wherein the first means receives absolute position information from the other vehicles, and determines therefrom distances to the other vehicles.

11. The motor vehicle of claim 9 wherein the first means is configured to use a time-of-response from a wireless transducer in an other motor vehicle to determine therefrom a distance to the other vehicle.

12. The motor vehicle of claim 1 wherein the first means is configured to communicate wirelessly with roadside markers to determine their relative positions and classifications, the first means receiving absolute position information from the roadside markers.

13. The motor vehicle of claim 1 wherein the first means is configured to communicate wirelessly with a transponder associated with a roadside object, including a road-side construction barrel, a worker, or road-construction equipment, to determine what the roadside object is and a position of the roadside object relative to the motor vehicle.

14. The motor vehicle of claim 1 wherein the second means comprises at least one camera disposed within the motor vehicle.

15. The motor vehicle of claim 1 wherein the second means is configured to sense a position or orientation of vehicle components including a rear-view mirror, side view mirrors, a driver's seat, an orientation-adjustable head up display mirror, and/or a head rest behind the driver's head.

* * * * *